(12) United States Patent
Bartusiak (10) Patent No.: US 7,824,753 B2
(45) Date of Patent: Nov. 2, 2010

(54) REMOVABLE ADHESIVE TAPE WITH FOLDABLE PULL TAB

(75) Inventor: Joseph T. Bartusiak, Osseo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 359 days.

(21) Appl. No.: 11/769,897

(22) Filed: Jun. 28, 2007

(65) Prior Publication Data

US 2009/0004422 A1 Jan. 1, 2009

(51) Int. Cl.
*B32B 9/00* (2006.01)
*B32B 33/00* (2006.01)
*B65D 65/28* (2006.01)

(52) U.S. Cl. .................. 428/40.1; 428/42.2; 428/43

(58) Field of Classification Search ............... 428/40.1, 428/42.2, 43, 906; 206/411
See application file for complete search history.

(56) References Cited

U.S. PATENT DOCUMENTS

| | | | |
|---|---|---|---|
| 4,024,312 A | 5/1977 | Korpman | |
| 5,103,970 A | 4/1992 | Nielson et al. | |
| 5,111,381 A | 5/1992 | Pigott et al. | |
| 5,491,012 A | 2/1996 | Lühmann et al. | |
| 5,516,581 A | 5/1996 | Kreckel et al. | |
| 5,759,342 A | 6/1998 | Luhman et al. | |
| 5,824,380 A | 10/1998 | Hagen | |
| 5,925,459 A | 7/1999 | Zimmermann et al. | |
| 5,935,669 A * | 8/1999 | Leeuwenburgh | 428/40.1 |
| 6,527,900 B1 | 3/2003 | Kreckel et al. | |
| 6,541,089 B1 | 4/2003 | Hamerski et al. | |
| 6,572,945 B2 | 6/2003 | Bries et al. | |
| 6,641,096 B2 | 11/2003 | Johansson et al. | |
| 6,641,910 B1 | 11/2003 | Bries et al. | |
| 7,506,450 B2 | 3/2009 | Spaulding et al. | |
| 2002/0009568 A1 | 1/2002 | Bries et al. | |
| 2002/0165477 A1 | 11/2002 | Dunshee | |
| 2003/0159961 A1 | 8/2003 | Hamerski et al. | |
| 2004/0071918 A1* | 4/2004 | Cohen | 428/40.1 |
| 2006/0003129 A1 | 1/2006 | Thiele et al. | |
| 2009/0000722 A1 | 1/2009 | Bartusiak | |
| 2009/0000972 A1 | 1/2009 | Bartusiak | |

FOREIGN PATENT DOCUMENTS

| | | |
|---|---|---|
| DE | 33 31 016 C2 | 10/1984 |
| KR | 10-2007-0030316 A | 3/2007 |
| WO | WO 95/06691 | 3/1995 |
| WO | WO 98/06652 | 2/1998 |

\* cited by examiner

*Primary Examiner*—Patricia L Nordmeyer
(74) *Attorney, Agent, or Firm*—Kenneth B. Wood (57) ABSTRACT

A stretch releasing adhesive tape is disclosed comprising a pull tab comprising a single tab film which is adhered to both adhesive surfaces of the stretch releasing adhesive tape. The pull tab is foldable so as to comprise an unobtrusive visual appearance, and may also be extendable so that the pull tab may be grasped to activate the stretch release.

20 Claims, 4 Drawing Sheets

REMOVABLE ADHESIVE TAPE WITH FOLDABLE PULL TAB

BACKGROUND

Stretch releasing adhesive tapes are useful in a wide variety of assembling, joining, attaching, and mounting applications. Such tapes are well known in the art and are often used, for example, in circumstances in which it is desired to attach an object to another object, and to be able to separate the objects without any lasting visual disfigurement of, or leaving adhesive residue on, either object.

U.S. Pat. No. 4,024,312 to Korpman discloses a highly conformable adhesive tape including a highly extensible and elastic backing film laminated with an adhesive layer. The backing film possesses a lengthwise elongation at break of at least about 200%. The tape is easily stretchable and may be removed from a surface by stretching the tape lengthwise in a direction substantially parallel to the surface.

German Patent No. 33 31 016 discloses a high elasticity, low plasticity adhesive film based on a thermoplastic rubber and tackifying resins, wherein the adhesive bond can be broken by stretching the adhesive film in the direction of the plane of the adhesive bond.

U.S. Pat. No. 5,516,581 to Kreckel et al. discloses a removable adhesive tape having a highly extensible and substantially inelastic backing coated with a layer of pressure sensitive adhesive. The adhesive tape can be removed from a substrate without damaging the substrate by stretching the tape in a direction substantially parallel to the surface of the substrate. The tape backing has a lengthwise elongation at break of from about 150% to about 1200%, a Young's modulus of at least about 2,500 psi to about 72,500 psi, and an elastic recovery of less than about 50% after being stretched and removed.

PCT International Publication No. WO 95/06691 discloses removable foam adhesive tape comprising a backing including a layer of polymeric foam, and a layer of pressure-sensitive adhesive coated on at least one surface of the backing. The foam layer of the backing has a thickness of about 30 to about 1000 mils, and the backing has a lengthwise elongation at break of from about 50% to about 1200%, and a Young's modulus of less than about 2,400 psi.

Figure 1:
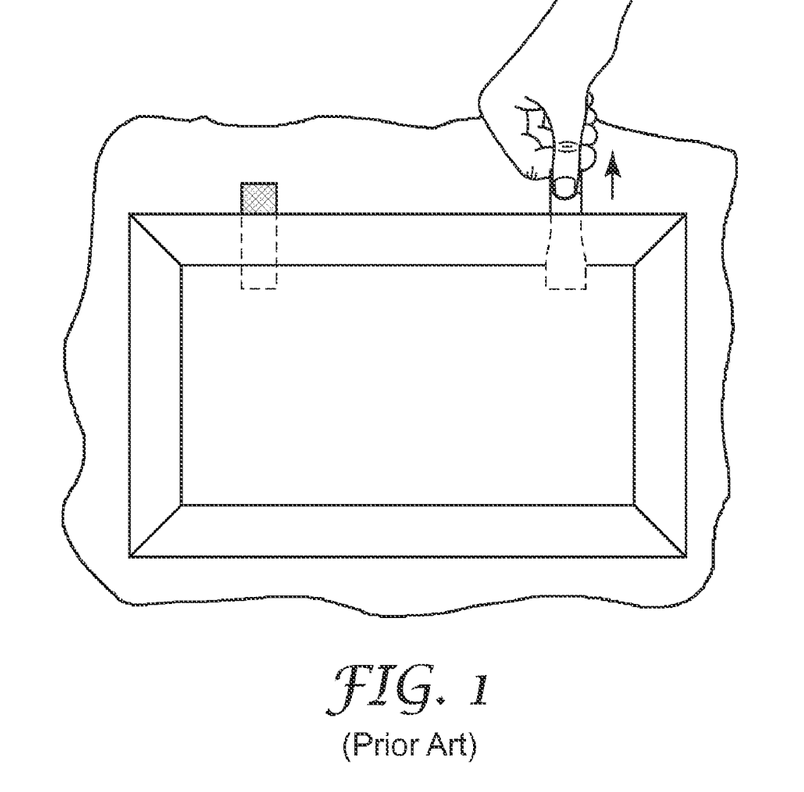
FIG. 1 is a front view of a bonding system of the art.

Conventional use of stretch releasing adhesive tapes may involve the existence of a visible pull tab, as pictured in prior art FIG. 1. Often, the adhesive surface of a particular portion of the stretch releasing adhesive tape is rendered non-adhesive (e.g. by application of a coating, lamination of a film, etc.) so that this portion of the adhesive tape serves as the pull tab.

PCT International Publication No. WO 98/06652 discloses a length cutting fixture which can be used to form a pull tab or "gripper" at the end of a long length of a conventional single-sided adhesive tape. The length cutting fixture also serves to cut the long length of tape, now including the gripper, to any desired length. The gripper is formed by folding the end of the tape back onto itself.

U.S. Pat. No. 5,491,012 to Luhmann et al. discloses a strip of an adhesive film for a re-releasable adhesive bond, one end of the strip being provided on both sides with a UV-opaque covering which at the same time serves as a tab for pulling.

U.S. Pat. No. 6,641,910 to Bries and Johansson discloses a stretch releasing tape that includes a segmented liner that can be used to form a manually engagable pull tab.

SUMMARY

Applicant discloses articles for bonding together the opposing surfaces of objects. Often, an elongate length of stretch releasing adhesive tape is used for such applications. Such a stretch releasing tape typically comprises a non-adhesive portion (often called a pull tab) that can be grasped and pulled by a user to activate the stretch release properties of the tape and thus remove the tape and separate the objects. A pull tab must typically be of some minimum length (for example, about 10 mm) in order to be easily grasped and pulled. Users may desire that such a tab be unobtrusive. Applicant herein discloses a stretch releasing article that can result in a pleasing visual appearance by virtue of a tab which is foldable so as to be unobtrusive and yet is movable into an extended position which permits it to be more readily grasped and pulled.

In one aspect, an area of one major surface of the tab film is attached to one major adhesive surface of an elongate piece of the adhesive tape to form a first tab/tape bonded area; another area of the same major surface of the tab film piece is attached to the other major adhesive surface of the tape to form a second tab/tape bonded area; and, at least some portion of the thus-formed pull tab protrudes beyond the terminal edge of the elongate piece of adhesive tape. The tab may be provided in a folded position in which at least a portion of the protruding portion of the tab is in overlapping relation with at least a portion of a tab/tape bonded area. In such a configuration, the tab may be partially or completely hidden behind an object that is bonded. In another embodiment, the tab may be provided in a folded position such that a part of the protruding tab portion is in overlapping relation with at least a portion of a first tab/tape bonded area, and another part of the protruding tab portion is in overlapping relation with at least a portion of a second tab/tape bonded area. In another embodiment, the tab may be movable into an extended position. In a further embodiment, the tab may be movable between folded and extended conditions. Such an extendable and foldable tab may exhibit an extension ratio as defined herein.

In one embodiment, the tab is formed from a tab film with an adherable surface that is capable of strong bonding to the adhesive surface of the stretch release tape.

In various other aspects, applicant discloses articles and methods by which a pull tab may be attached to a stretch releasing adhesive tape by use of the pressure sensitive adhesive of the stretch releasing tape. The stretch releasing property of the adhesive tape may be activated by grasping and pulling the protruding portion of the pull tab, without grasping any portion of the adhesive tape itself. That is, pulling the tab may activate the stretch release so as to break the bond between the adhesive surface of the tape and the surface of the object(s) bonded, while maintaining the bond between the adhesive tape and the pull tab film. In one embodiment, the adhesive tape can be completely debonded from bonded objects by pulling the pull tab. In an alternative embodiment, the pull tab may be pulled so as to partially debond the adhesive tape from the bonded objects and partially stretch the adhesive tape, such that a portion of the adhesive tape protrudes sufficiently from between the objects so that the user can then grasp and pull the adhesive tape itself so as to finish debonding the adhesive tape.

The stretch releasing adhesive tape with attached tab may be supplied in the form of discrete strips, or as a continuous sheet from which individual discrete strips may be detached. Such a continuous sheet may take the form of a roll. If provided as a continuous sheet, weakened zones (perforations, etc.) may be provided in the tab and/or in the stretch releasing adhesive tape, to provide for easy removal of individual discrete elongate pieces of stretch releasing adhesive tape by the end user.

Applicant thus discloses in one aspect a stretch releasing adhesive tape article with a pull tab, comprising: an elongate length of stretch releasing tape having first and second oppositely facing major surfaces bearing adhesive; and, a pull tab attached to a terminal end of the elongate length of stretch releasing adhesive tape and having a portion that protrudes past a terminal edge of the terminal end of the elongate length of stretch releasing tape; wherein the pull tab is comprised of a single tab film having first and second oppositely facing major surfaces; wherein a first area of the first major surface of the tab film is bonded to an area of the first major adhesive surface of the tape to form a first tab/tape bonded area, and a second area of the first major surface of the tab film is bonded to an area of the second major adhesive surface of the tape to form a second tab/tape bonded area; and wherein the tab comprises a folded position such that a part of the protruding tab portion is in overlapping relation with at least a portion of a tab/tape bonded area.

Applicant thus discloses in another aspect an article comprising separable segments of elongate lengths of stretch releasing adhesive tape with pull tabs comprising: a continuous length of stretch releasing tape material having first and second side edges and first and second oppositely facing major surfaces bearing adhesive; a pull tab material which protrudes past the first side edge of the length of tape material; wherein the pull tab material comprises a tab film material with first and second major surfaces, wherein the first major surface of the tab film material is bonded to both the first and the second opposite major adhesive surfaces of the tape material; and wherein the tape material and the pull tab material comprise aligned, longitudinally spaced laterally extending, separation zones such that individual elongated lengths of stretch releasing adhesive tape with a pull tab attached to a terminal end thereof, can be separated from the continuous length of tape material. In one embodiment, the article may comprise a roll. In one embodiment, the protruding tab material comprises a folded position such that a part of the protruding tab material is in overlapping relation with at least a portion of a tab/tape bonded area. In another embodiment, the protruding tab material comprises a folded position such that a first part of the protruding tab material is in overlapping relation with at least a portion of a first tab/tape bonded area, and a second part of the protruding tab material is in overlapping relation with at least a portion of a second tab/tape bonded area.

DETAILED DESCRIPTION

Although terms such as "top", "bottom", "upper", "lower", "front" and "back", and "first" and "second" may be used in this disclosure, it should be understood that those terms are used in their relative sense only. For example, when a tab film is described as being attached to the first major surface (of two major surfaces) of a stretch release article, unless otherwise stated, such first surface could be either of the two surfaces. Also, in the Figures, like reference numerals are used to designate like features throughout. Drawings and elements therein are not to scale unless noted.

Figure 2:
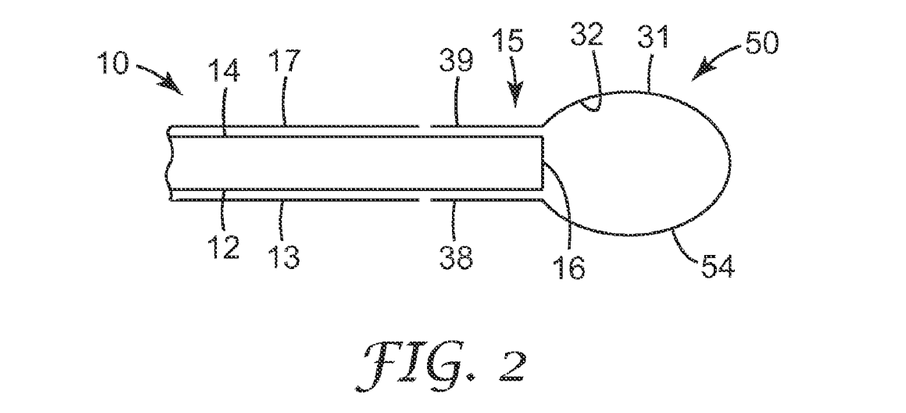
FIG. 2 is a side view of an exemplary tab which is attached to both major surfaces of an elongate length of stretch releasing adhesive tape.

Referring to FIG. 2, there is shown an article 10 comprising an elongate length of stretch releasing adhesive tape, comprising first major adhesive surface 12, second (opposite) major adhesive surface 14, and terminal end 15 which comprises terminal edge 16. The adhesive can comprise any pressure-sensitive adhesive that can be adhered firmly to a substrate and thereafter removed therefrom by stretching. Thus, a stretch releasing adhesive tape can comprise an elastic backing or core, or a highly extensible and substantially inelastic backing, with a pressure-sensitive adhesive disposed (e.g. coated) thereupon both surfaces. Or the tape can be formed of a solid, elastic pressure sensitive adhesive, thus, in this context, the term "tape" encompasses products that comprise a unitary, integral, or solid construction of adhesive (in addition to products that comprise a backing with separate layers of adhesive residing thereupon). Suitable stretch releasing tapes are described in U.S. Pat. No. 4,024,312 (Korpman), German Patent No. 33 31 016, U.S. Pat. No. 5,516,581 (Kieckel et al.), and PCT International Publication No. WO 95/06691 (Bries et al).

One or both adhesive surfaces 12 and 14 can be supplied with release liner 13 and/or release liner 17. The liner or liners can be any conventional readily removable liner. Typical liners include a backing formed of, for example, paper or a polymeric film such as polyethylene, polypropylene, or polyester, which is coated with a release agent such as a silicone, a fluorochemical, or any other conventionally known coating (for example, those coatings known in the art as low adhesion backsizes) that renders the surface substantially nonadhesive. An often preferred liner is silicone coated paper. Often, a liner with release agent present on both major surfaces is used with stretch releasing adhesive tapes, such that if the length of stretch releasing adhesive tape comprises a roll, one surface of the liner contacts adhesive surface 12, and the other surface of the liner contacts adhesive surface 14. In such a case only one release liner need be used. If present, such liner or liners are typically removed by the end user in use of the stretch releasing adhesive tape.

Referring still to FIG. 2, a tab 50 is provided at terminal end 15 of the stretch releasing adhesive tape. The tab is comprised of a single piece of tab film which is bonded to both adhesive major surfaces 12 and 14 of the tape. The tab film material should have sufficient thickness and strength so as to not break or tear when the tab formed therefrom is gripped and pulled. That is, the tab film should survive the force used to activate the stretch release property of the stretch releasing adhesive tape. In various embodiments, the tab film can be at least about 12 microns or 25 microns in thickness. The tab film should not however be so thick as to be difficult to handle. In various embodiments, the tab film is at most about 75 microns or 50 microns in thickness.

Representative examples of materials suitable for tab films include polyolefilns, such as polyethylene, including high density polyethylene, low density polyethylene, linear low density polyethylene, and linear ultra low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrilebutadiene-styrene copolymers, and ethylene/propylene copolymers; acrylic polymers and copolymers; and combinations of the foregoing. Polyester based materials (e.g. poly(ethylene terephthalate), poly(butylene terephthalate), etc.) may also be used. Mixtures or blends of any plastic or plastic and elastomeric materials such as polypropylene/polyethylene, polyurethane/polyolefin, polyurethane/polyearbonate, polyurethane/polyester, can also be used. Cellulosic films (e.g. paper, cellophane, etc.) can also be used. Tab films can also be prepared from filled materials, such as, for example, filled films, e.g., calcium carbonate filled polyolefins. Tab films can be made by any known method of film forming, such as, for example, extrusion, co-extrusion, solvent casting, and the like. Clear films may be preferred for many applications.

The tab film may comprise at least one adherable surface. An adherable surface refers generally to a surface that is capable of bonding to a pressure-sensitive adhesive (such as those typically used in stretch releasing adhesive tapes, and described in further detail in, e.g. U.S. Pat. No. 5,516,581 to Kreckel et. al.) such that the tab film is not removable from the pressure sensitive adhesive, or is not removable without damaging the adherable surface of the tab film, the tab film material, the pressure sensitive adhesive of the stretch releasing tape, or the elastic backing (if present) of the stretch releasing tape. As such, an adherable surface can comprise any surface that does not comprise a release liner as described above. That is, an adherable surface is one that does not comprise a release coating, low adhesion backsize, treatment or ingredient such as a silicone or silicone containing material, a fluorinated or fluorine-containing material, a fluorosilicone material, or the like.

An adherable surface of the tab film material may be treated to improve its ability to adhere to the adhesive surface of the stretch releasing adhesive tape. For example, corona discharge, plasma discharge, flame treatment, electron beam irradiation ultraviolet radiation, chemical vapor deposition, acid etching, or chemical priming may be used. In one embodiment, a pressure sensitive adhesive is disposed on a tab film surface to improve adhesion.

It may not be necessary that the other surface of the tab film be adherable as defined herein. However, this other surface should be readily graspable by the user, and may comprise a treatment (roughened surface, etc.) so as to provide enhanced grippability. Other treatments may be used as desired, as discussed in detail later herein.

In various embodiments, either or both of the adherable surface and the graspable surface may be treated in specific areas so as to provide different properties in different areas of that surface, e.g. by stripe coating, pattern coating, and the like. For example, areas of higher adhesion properties (achieved by priming, or by coating adhesive, etc.) may be provided. Instead of this, or in addition to this, areas of lower adhesion properties (achieved by coating release agents, etc.) may be provided.

With reference to FIG. 2, tab 50 comprises first major surface 32 and second major surface 31. A first area of major surface 32 of the tab film is adhered to an area of first major adhesive surface 12 of the tape, so as to comprise tab/tape bonded area 38. A second area of major surface 32 of the tab film is adhered to an area of second major adhesive surface 14 of the tape, so as to comprise tab/tape bonded area 39. In various embodiments, bonded areas 38 and 39 each are present for a distance of at least about 4, 8 or 12 mm along the elongate length of the tape from the terminal edge 16 of the adhesive tape.

Bonding by the adhesive surface 12 or 14 may be the sole manner by which the tab film is attached to the tape. Or, additional bonding methods may be used to improve the bonding, such as ultrasonic welding, heat bonding, laser bonding and the like. Such additional bonding may penetrate the adhesive surface 12 (or 14) and cause the tab film to be bonded directly to an elastic core of the adhesive tape, if present.

Figure 3:
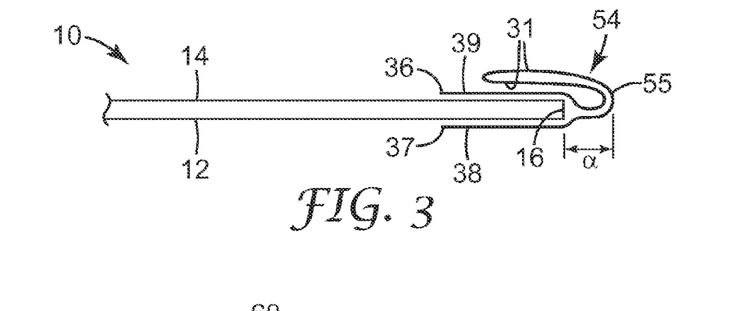
FIG. 3 is a side view of an elongate length of stretch releasing adhesive tape, with a protruding tab in an exemplary folded position.

Referring still to FIG. 2, the disclosed stretch releasing adhesive tape with pull tab comprises an elongate length of stretch releasing adhesive tape with a tab 50 comprising portion 54 that protrudes past terminal edge 16 of terminal end 15 of the tape. In one embodiment, the tape is provided to the end user with the tab in a folded position, such that at least part of the protruding tab portion 54 is in overlapping relation with at least a portion of the stretch releasing adhesive tape (typically, with at least a portion of tab-tape bonded area 39 or 38). One exemplary folded configuration is illustrated in FIG. 3. In one embodiment, tab/tape bonded area 39 is sized and positioned such that the protruding portion of the tab film can be folded without coming into contact with the adhesive surface 14 of the tape. In an alternative embodiment, the tab/tape bonded area 39 is sized and positioned such that at least a part of the protruding portion of the tab can be folded so as to come into contact with at least a portion of adhesive surface 14, as explained later in detail.

Figure 4:
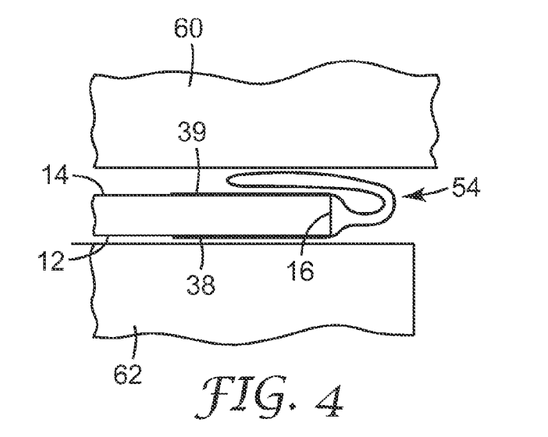
FIG. 4 is a side view of two objects bonded to each other by an elongate length of stretch releasing adhesive tape, with a protruding tab in an exemplary folded position.

As depicted in FIG. 4, when the stretch releasing adhesive tape is used to bond two objects 60 and 62 together, this folded configuration may allow at least part of protruding portion 54 to be partially or completely hidden behind object 62. In this manner, the tab can remain so hidden until it is desired to activate the stretch releasing adhesive tape and debond objects 60 and 62. At that time, the tab can be unfolded (most easily by use of a small tool such as a wire, unfolded paper clip, toothpick, etc.) and placed in an extended position such that the user can grasp the tab and pull so as to activate the stretch release property of the adhesive tape. In one embodiment, when the tab is in an extended position the user can grasp and pull the protruding portion of the tab in order to activate the stretch release property of the tape, without grasping and pulling any portion of the stretch release adhesive tape itself.

Figure 5A:
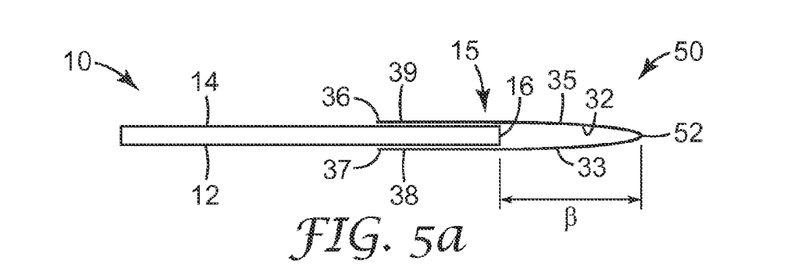
FIG. 5a is a side view of an elongate length of stretch releasing adhesive tape with a protruding tab in an exemplary extended position.
Figure 5B:
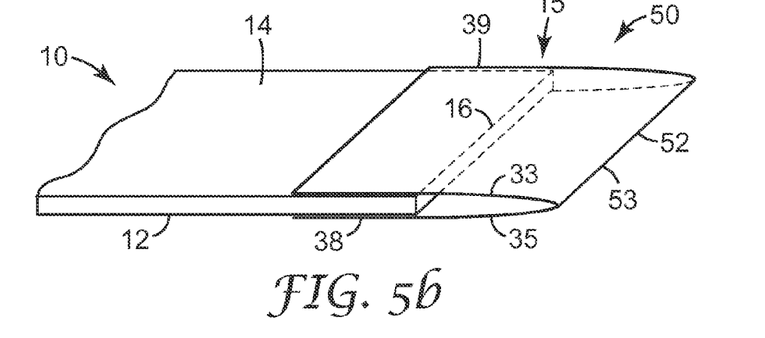
FIG. 5b is a perspective view of an elongate length of stretch releasing adhesive tape with a protruding tab in an exemplary extended position.

An extended position denotes a configuration of the tab in which the protruding tab portion comprises a largely planar configuration in which at least a part of tab film portions 33 and 35 are in close proximity or touching (as depicted in an exemplary manner in FIGS. 5a and 5b). In this extended position, the point most distant from the tape terminal edge 16 comprises point 52. In one embodiment, this point may comprise a crease 53 as shown in FIG. 5b and described below. In various embodiments, when in an extended position, the tab may protrude such that tab end 52 is at least about 10 or 15 mm beyond terminal edge 16 of the adhesive tape. In various embodiments, tab end 52 is at most about 30 or 40 mm beyond terminal edge 16. This extension may be largely in the plane of the stretch releasing adhesive tape; alternatively it may protrude at an angle from the plane of the tape, as long as the tab can be grasped by the user.

In one embodiment, the tab can be sized and positioned so that the fully-extended distance from terminal edge 16 to most distant point 52 (i.e. distance β in FIG. 5a, generally measured in a direction parallel to the elongate length of the tape, as are the other measured distances discussed herein) is less than the distance from tape terminal edge 16 to the edge 37 of tab/tape bonded area 38 (and/or less than the distance from tape terminal edge 16 to the edge 36 of tab/tape bonded area 39). In this embodiment, when the tab is folded (such as illustrated in FIG. 3), graspable surface 31 of the tab film will not come in contact with adhesive surface 12 or 14.

In an alternative embodiment, the tab can be sized and positioned so that the fully-extended distance from terminal edge 16 to most distant point 52 (i.e. distance β in FIG. 5a) is greater than the distance from tape terminal edge 16 to the edge 37 of tab/tape bonded area 38 (and/or greater than the distance from tape terminal edge 16 to the edge 36 of tab/tape bonded area 39). In this embodiment, when the tab is in a folded position, surface 31 of the tab may be in contact with at least a portion of adhesive surface 12 or 14. Such a configuration may be advantageous in a circumstance in which it is desired to hold the tab in a folded position by use of the adhesive, until such time as it is desired to unfold the tab. Accordingly, the tab may be sized and positioned such that when folded, an area of the protruding portion of the tab may be brought into contact with an area of adhesive surface 12 or 14 that is sufficiently large so as to hold the tab in a folded position, but is sufficiently small so as to allow the tab to be successfully detached from adhesive surface 12 or 14 and unfolded. In various embodiments, the tab may be sized and positioned so that such a tab/adhesive overlap area is present for a distance of at least about 2, 4 or 6 mm along the elongate length of the tape from edge 37 or edge 36 of a tab/tape bonded area. In alternate embodiments, the tab may be sized and positioned so that a tab/adhesive overlap area is present for a distance of at most about 14, 12 or 10 mm along the elongate length of the tape from edge 37 or edge 36 of a tab/tape bonded area. In various additional embodiments, at least some portions of surface 31 of the tab film may be treated (e.g. by the use of priming treatments to increase adhesion, or low energy treatments so as to reduce adhesion) so as to achieve the desired balance of properties such that the folded tab can be adhered to the adhesive surface, but can be later released. Such treatments may be applied to the entirety of surface 31 of the tab film or may be applied in designated areas.

In an alternative embodiment, at least a portion of tab surface 31 may comprise adhesive (e.g. pressure-sensitive adhesive). In one embodiment, a portion of surface 31 that is in the protruding portion of tab 50 can comprise adhesive so as to be bondable to a portion of surface 31 that is in the tab/tape bonded area 38 or 39. Alternatively, a portion of surface 31 that is in the tab/tape bonded area 38 or 39 can comprise adhesive so as to be bondable to a portion of surface 31 that is in the protruding portion of tab 50. The amount of adhesive can be selected (for example, by pattern coating or stripe coating), and/or the adhesive composition can be selected so as to have a desired bonding power, so as to be able hold the tab in a folded position, until such time as it is desired to unfold the tab.

As illustrated in FIGS. 3 and 5a, an extension ratio can be defined as the ratio of the protrusion distance of the tab when extended (distance β from tape terminal edge 16 to most distant point 52, in FIG. 5a), to the protrusion distance of the tab when folded 20 (distance α from tape terminal edge 16 to most distant point 55, in FIG. 3). In various embodiments, this β/α extension ratio can be at least about 3, 5, or 7.

In various embodiments, the tab film pieces are supplied with a crease or creases for ease of providing the tab in a folded position, moving it into a folded position, and/or maintaining it in that position. Such a crease or creases may serve as well for ease of moving the tab into an extended position and/or maintaining it in that position. Such a crease may comprise a linear zone in which the tab film material was treated (e.g. weakened, perforated, ablated, etc.) so as to provide the tab film with a tendency to fold preferentially along the linear zone. Or, such a crease may comprise a linear zone in which the film material was biased (folded, crimped, etc.) so as to provide the tab film with a tendency to fold preferentially along the linear zone, in a particular direction. In one embodiment, such creases are oriented parallel to the short axis of the tab film so as to be oriented transversely to the elongate length of the stretch release article (exemplified by crease 53 in FIG. 5b).

Figure 6:
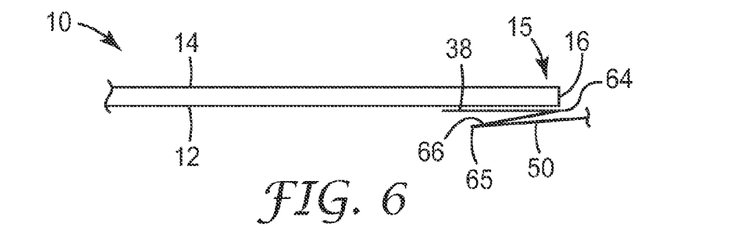
FIG. 6 is a partial side view of an elongate length of stretch releasing adhesive tape with a protruding tab in an exemplary Z-folded position.

In one embodiment, as mentioned previously, the tab film may comprise a crease such that when the tab is placed in an extended position, crease line 53 is naturally formed at most distant point 52 (as illustrated in FIG. 5b). In another embodiment, multiple creases are provided in the tab film so that the tab can be placed in a Z-folded position. An exemplary Z-folded tab with such multiple creases is shown in FIG. 6. The tab film possesses at least two transverse creases 64 and 65 which serve to allow at least one portion 66 of the tab to be placed by the user in overlapping relation with tab-tape bonded area 38. In one embodiment, creases 64 and 65 are oppositely biased.

In one embodiment, the tab film is sized and positioned appropriately, and the creases are positioned and spaced, such that tab/tape bonded area 38 is of greater extent in the elongated direction of the article 10 than is portion 66 (as illustrated in the embodiment of FIG. 6). In this embodiment, when the tab is Z-folded as illustrated in FIG. 6, the tab is unlikely to come in contact with adhesive surface 12. Likewise, in one embodiment crease 64 is positioned even with terminal edge 16, such that adhesive surface 12 is not exposed. In an alternative embodiment, the tab film is sized and positioned appropriately, and the creases are positioned and spaced, such that tab/tape bonded area 38 is of lesser extent in the elongated direction of the article 10 than is portion 66, such that tab portion 66 may be placed in contact with at least a portion of adhesive surface 12. As discussed above, such a configuration may be advantageous in a circumstance in which it is desired to hold the tab in a folded position by means of the adhesive until such time as it is desired to unfold the tab.

Figure 7A:
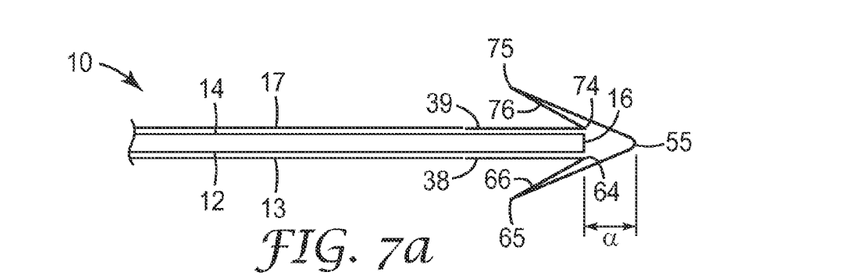
FIG. 7a is a side view of an elongate length of stretch releasing adhesive tape with a protruding tab in an exemplary dual Z-folded position.
Figure 7B:
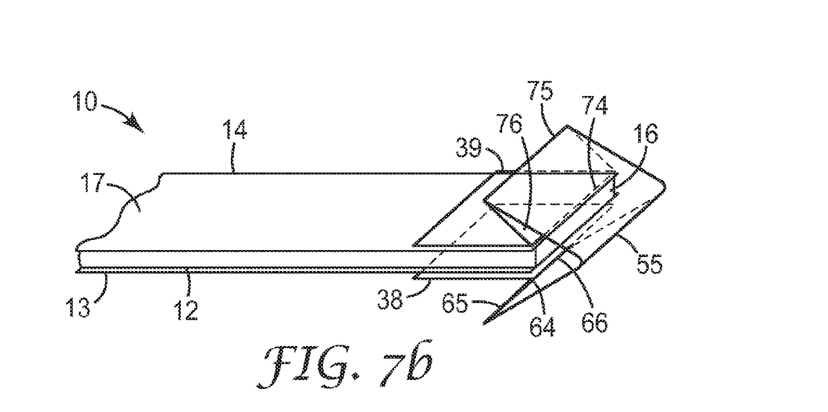
FIG. 7b is a perspective view of an elongate length of stretch releasing adhesive tape with a tab in an exemplary dual Z-folded position

An additional embodiment is depicted in FIGS. 7a and 7b. In this dual Z-folded arrangement, at least four creases are provided: creases 64 and 65 as mentioned with reference to FIG. 6, and two creases 74 and 75 such that the tab is Z-folded on the opposite side of the stretch release article. In various embodiments, creases 74 and 75 are oppositely biased; also, they may be spaced and positioned in similar manner as described above for creases 64 and 65, to similar effect. In addition to the creases that provide the dual Z-folded configuration, additional crease 53 can optionally be placed at the position of maximal extension, as mentioned previously.

Figure 8:
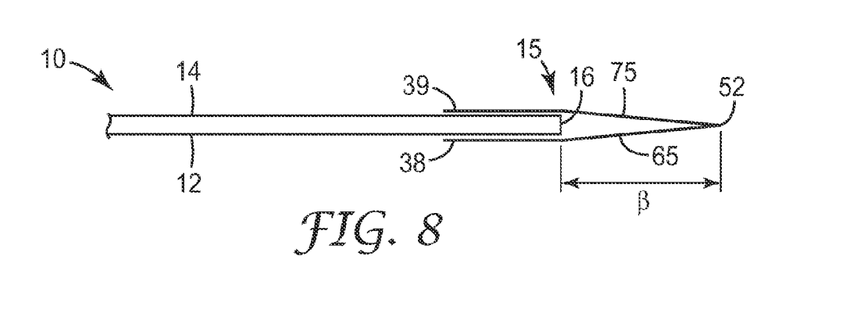
FIG. 8 is a side view of an elongate length of stretch releasing adhesive tape with a protruding tab in an exemplary extended position.

A stretch releasing adhesive tape can be provided to the user With the tab in a dual Z-folded position such that the tab protrudes a distance α, as shown in FIG. 7a. At the time it is desired to activate the stretch release, the tab can be placed into an extended position (such as by the use of a small tool as described previously), such that the tab protrudes a distance β as shown in FIG. 8. Such a dual Z-fold design may allow the tab to be provided with a high extension ratio, as defined previously herein. In various embodiments, this extension ratio can be at least about 3, 5, or 7.

Thus, in various embodiments, tabs can be provided with at least one, two, four, or five creases, and can be provided in Z-folded or dual Z-folded positions, in each case with or without an additional crease at the position of maximum extension. Such Z-folding can be performed on the tab film prior to it being attached to the stretch releasing adhesive tape.

Figure 9:
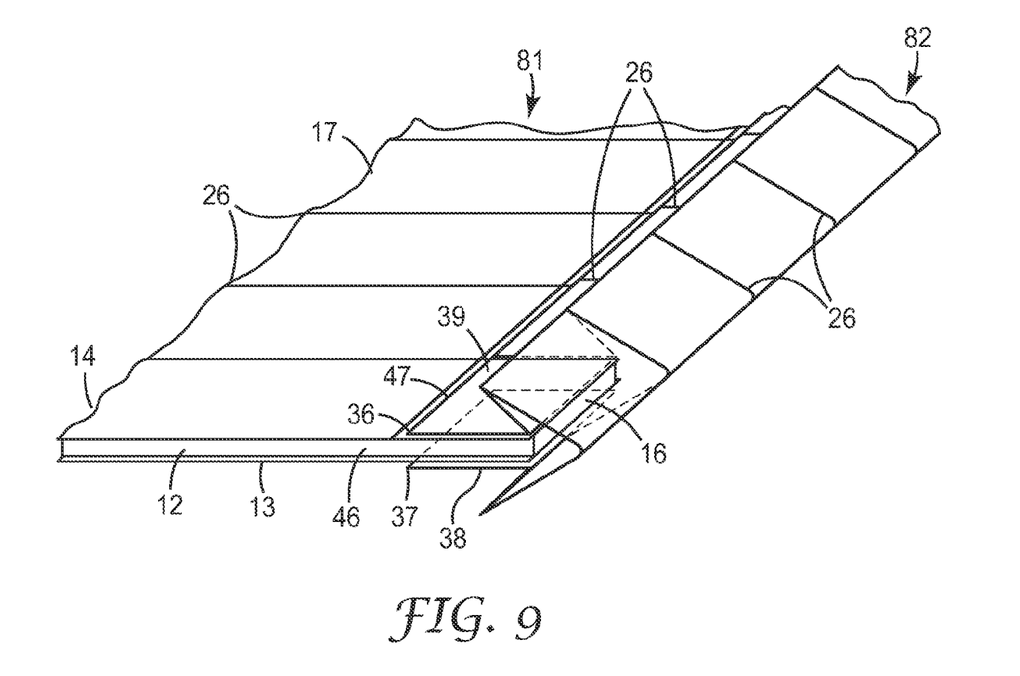
FIG. 9 is a perspective view of an exemplary continuous sheet of stretch releasing adhesive tape material with attached dual Z-folded tab material.

In one embodiment, elongate lengths of stretch releasing adhesive tape are provided as discrete strips. In an alternative embodiment, stretch releasing adhesive tape with attached folded tab material is provided as a continuous sheet 81 of stretch releasing adhesive tape material with folded tab material 82 attached to a side edge thereof, as illustrated in the exemplary arrangement shown in FIG. 9. In this embodiment, the Z-folding is performed on the tab film material while the tab film material is still in continuous roll form. In such a case, individual elongate lengths of tape, each with an attached tab, are detachable from the continuous sheet for use. The continuous sheet may be provided such that a user can cut the sheet so as to form an elongate piece. Alternatively, aligned, longitudinally spaced separation zones 26 can be provided transversely across the width of the stretch releasing adhesive tape material and the attached tab material (as shown in FIG. 9), such that elongate lengths of stretch releasing adhesive tape with attached tab can be detached by tearing. Such separation zones can be lines of weakness achieved by scoring, perforation, etc. In one embodiment, the continuous sheet of tape material with attached tab material is provided as a roll.

If the stretch releasing adhesive tape material with attached tab material is manufactured in roll form (even if it is separated into discrete strips prior to being supplied to the user), it is common to utilize a release liner 13 and/or 17 as previously described and as shown in FIG. 9. Typically, such a liner will extend to the edge 37 of tab-tape bonded area 38 and/or edge 36 of tab-tape bonded area 39 (as depicted in FIG. 9), so that no part of the adhesive surface 12 or 14 is exposed prior to removal of the liner from that surface. The liner(s) may also comprise separation zones 26.

In one embodiment, the thickness of the liner is similar to that of the tab film. In other embodiments, it may be advantageous for the thickness of the release liner to be approximately equal to the combined thickness of the folded tab film on that side of the tape. For example, if a Z-folded configuration is used, it may advantageous for the thickness of the release liner to be chosen such that it is approximately three times that of the tab film, such that the release liner thickness is approximately equal to that of the combined three layers of the Z-folded tab film. This may ensure that if the adhesive tape is manufactured in roll form, the roll will have a uniform thickness across the width of the adhesive tape, which can be advantageous in roll handling and converting.

In an alternative embodiment, the release liner may overlap edge 46 of the tab-tape bonded area, which may make it easier to peel the release liner off of the tape. In such a case, it may be advantageous for the thickness of the release liner to be approximately equal to that of the remaining layers of the folded tab film. For example, in the case of a Z-folded tab film, it might be advantageous for the release liner to have a thickness of about twice that of the tab film.

A number of embodiments of the invention have been described. Nevertheless, it will be understood that various modifications may be made without departing from the invention. Accordingly, other embodiments are within the scope of the following claims.

What is claimed is:

1. A stretch releasing adhesive tape article with a pull tab, comprising:
    an elongate length of stretch releasing tape having first and second oppositely facing major surfaces bearing adhesive; and, a pull tab attached to a terminal end of the elongate length of stretch releasing adhesive tape and having a portion that protrudes past a terminal edge of the terminal end of the elongate length of stretch releasing adhesive tape;
    wherein the pull tab is comprised of a single tab film having first and second oppositely facing major surfaces;
    wherein a first area of the first major surface of the tab film is bonded to an area of the first major adhesive surface of the tape to form a first tab/tape bonded area, and a second area of the first major surface of the tab film is bonded to an area of the second major adhesive surface of the tape to form a second tab/tape bonded area;
    wherein the tab comprises a folded position such that a part of the protruding tab portion that does not comprise an area of the first major surface of the tab film that is bonded to an area of the first major surface of the tape or an area of the second major surface of the tape, is in overlapping relation with at least a portion of a tab/tape bonded area; and,
    wherein the entirety of the first major surface of the tab film consists of an adherable surface.

2. The article of claim 1, wherein the tab is movable from a folded position to an extended position and wherein the extension ratio between the extended and folded positions is at least about five.

3. The article of claim 1, wherein the tab comprises a Z-folded configuration.

4. The article of claim 1, wherein when in an extended position the tab protrudes at least 10 mm beyond the terminal edge of the elongate length of adhesive tape.

5. The article of claim 1, wherein the tab comprises a folded position such that a part of the protruding tab portion is adjacent to, and in overlapping relation with, at least a portion of a first tab/tape bonded area, and another part of the protruding tab portion is adjacent to, and in overlapping relation with, at least a portion of a second tab/tape bonded area.

6. The article of claim 5, wherein the tab comprises a dual Z-folded position.

7. The article of claim 6, wherein the protruding portion is extendable from a dual Z-folded position to an extended position and wherein the extension ratio between the extended and dual Z-folded positions is at least about five.

8. The article of claim 7, wherein when in an extended position the tab protrudes at least 10 mm beyond the terminal edge of the elongate length of adhesive tape.

9. The article of claim 1, wherein the tape comprises a releasable liner on at least one major adhesive surface of the tape, wherein the releasable liner covers the area of the adhesive surface that is not covered by the bonded tab film.

10. The article of claim 9, wherein the releasable liner and the tab film are of about the same thickness.

11. The article of claim 9, wherein the releasable liner is about three times as thick as the tab film.

12. The article of claim 1, wherein the stretch releasing property of the stretch releasing adhesive tape may be activated by grasping and pulling the protruding portion of the pull tab without grasping any portion of the adhesive tape itself.

13. An article comprising separable segments of elongate lengths of stretch releasing adhesive tape with pull tabs, comprising:
- a continuous length of stretch releasing tape material having first and second side edges and first and second oppositely facing major surfaces bearing adhesive;
- a pull tab material which protrudes past the first side edge of the length of tape material;
- wherein the pull tab material comprises a tab film material with first and second major surfaces, wherein the first major surface of the tab film material is bonded to both the first and the second opposite major adhesive surfaces of the tape material;
- wherein the tape material and the pull tab material comprise aligned, longitudinally spaced, laterally extending, separation zones defined by lines of weakness in the tape material and in the pull tab material such that individual elongated lengths of stretch releasing adhesive tape each with a pull tab attached to a terminal end thereof, can be separated from the continuous length of tape material;
- and wherein the individual elongated lengths of stretch releasing adhesive tape each comprise a length that is predetermined by the distance between the first and second side edges of the continuous length of stretch releasing tape material and a width that is predetermined by the distance between adjacent lines of weakness in the tape material.

14. The article of claim 13, wherein the article is a roll.

15. The article of claim 13, wherein the separation zones comprise lines of perforations in the tape material and pull tab material.

16. The article of claim 13 wherein the protruding tab material comprises a folded position such that a part of the protruding tab material is in overlapping relation with at least a portion of a tab/tape bonded area.

17. The article of claim 13, wherein the protruding tab material comprises a folded position such that a first part of the protruding tab material is in overlapping relation with at least a portion of a first tab/tape bonded area, and a second part of the protruding tab material is in overlapping relation with at least a portion of a second tab/tape bonded area.

18. The article of claim 17, wherein the protruding tab material comprises a dual Z-folded position.

19. The article of claim 13, wherein the tape comprises a releasable liner on at least one major adhesive surface of the tape material, wherein the releasable liner covers the area of the adhesive surface that is not covered by the bonded tab film material.

20. The article of claim 13, wherein the wherein the entirety of the first major surface of the tab film consists of an adherable surface.

* * * * *

UNITED STATES PATENT AND TRADEMARK OFFICE
CERTIFICATE OF CORRECTION

PATENT NO. : 7,824,753 B2
APPLICATION NO. : 11/769897
DATED : November 2, 2010
INVENTOR(S) : Joseph T Bartusiak It is certified that error appears in the above-identified patent and that said Letters Patent is hereby corrected as shown below:

Column 3
Line 29, delete "tabs" and insert -- tabs, --, therefor.

Column 3
Line 39, delete "spaced" and insert -- spaced, --, therefor.

Column 4
Line 46, delete "adhesive, thus," and insert -- adhesive. Thus, --, therefor.

Column 4
Line 52, delete "(Kieckel" and insert -- (Kreckel --, therefor.

Column 5
Line 20 (Approx.), delete "polyolefilns," and insert -- polyolefins, --, therefor.

Column 5
Line 28 (Approx.), delete "acrylonitrilebutadiene-styrene" and insert
-- acrylonitrile-butadiene-styrene --, therefor.

Column 5
Line 35 (Approx.), delete "polyurethane/polyearbonate," and insert
-- polyurethane/polycarbonate, --, therefor.

Column 5
Line 48, delete "Kreckel et. al.)" and insert -- Kreckel et al.) --, therefor.

Column 5
Line 64, delete "irradiation" and insert -- irradiation, --, therefor.

Signed and Sealed this
Third Day of May, 2011

David J. Kappos
*Director of the United States Patent and Trademark Office*

Column 8
Line 17, after "folded" delete "20".

Column 9
Line 13, delete "With" and insert -- with --, therefor.

Column 10
Line 53, in Claim 4, delete "claim 1," and insert -- claim 3, --, therefor.

Column 12
Line 31, in Claim 20, after "wherein the" delete "wherein the".